Dec. 19, 1967   H. BLEUER   3,358,612

TOWING DEVICE

Filed Jan. 19, 1965

United States Patent Office 3,358,612
Patented Dec. 19, 1967

3,358,612
TOWING DEVICE
Hans Bleuer, Lyss, Switzerland, assignor to Willy Buehler A.G., Bern, Switzerland, a company of Switzerland
Filed Jan. 19, 1965, Ser. No. 426,486
Claims priority, application Switzerland, Jan. 22, 1964, 640/64
6 Claims. (Cl. 104—173)

ABSTRACT OF THE DISCLOSURE

A towing device wherein a cable drum is arranged rotatable and comprises a spindle supported for rotation by a spring casing. A spirally wound spring is located in the casing and has its outer end fixed to the casing and its inner end connected to the spindle. The cross-section of the spring increases stepwise from the inner to the outer end thereof whereby the spring is incrementally strengthened from the inner to the outer end thereof and the spring force obtainable by completely unwinding the cable from the cable drum is thus greater than the normal maximum load applied to the towing cable.

---

In the case of ski lifts, the carrying capacity could be greatly increased by raising the operating speed of the carrying cable from approximately 3 metres per second as at present, to 5–6 metres per second, but this was not practicable in practice owing to the need for accelerating the passagers from a standing start to the carrying speed in a substantially jerk-free manner, irrespective of the weight of the passenger and of the varying sliding conditions. Driving or towing devices customary hitherto, which were secured to the carrying cable, were equipped with a towing cable arranged to be unreeled from a drum and with a spirally wound return spring device acting against the unreeling of the cable and the spring force characteristics of which did not result in a progressive increase, but merely in an approximately linear increase in spring force during the unreeling of the towing cable from the drum. It has been proposed to complement the action of the spring force by the incorporation of additional devices, in particular mechanical braking devices, in order to accelerate the user to the speed of the carrying cable by the time the towing cable has been completely unreeld from the drum and is thus directly linked to the carrying cable. These complementary devices, however, in each case come into operation with a slight delay and therefore do not allow of jerk-free conveyance of the passenger.

It has also been proposed to obtain a progressively rising spring traction force on the towing cable by strengthening the 1½–2 innermost turns of the spring element ending at the cable drum spindle, in order to engender greater resistance against flexing. This form of construction did not, however, prove satisfactory in practice, since during the unreeling of the towing cable, the non-reinforced portion of the spring element is initially wound down tight on to the as yet unstressed strengthened terminal turns with approximately linear rise in tractive force only, whereupon only a slight cable run-out causes the tractive spring force to rise powerfully in almost violent manner owing to stressing of the innermost turns. An increase in tractive force of progressive nature intervening only in the final stage of cable unreeling lacks adaptability to different operating and load conditions, since the space available for the flexing deflection of the inner most turns of the spring is taken up after slight additional cable run-out, thus producing positive connection between the towing cable and the carrying cable. Contriving the spring element strengthening at the point of the greatest spring curvature is most inappropriate technologically because specific material strain then reaches an optimum at this point and may result in more frequent spring breakages, especially at very low temperatures.

For the desired jerk-free conveying by means of the carrying cable of a ski lift it is necessary not only to fulfill the condition—as hitherto—that the towing device must accelerate the passenger to the speed of the carrying rope by the time the towing cable has been reeled off the drum completely, but also that the device should keep the passenger coupled to the carrying cable in such manner that he is always connected in spring-loaded manner only to this cable by means of the return spring element, the maximum load normally possible in operation on the towing cable never causing its complete unreeling, since the spring force corresponding to complete unreeling of the towing cable off the drum must in all cases be greater than the maximum load which may act on the towing cable.

According to the invention there is provided a towing device comprising a cable drum rotatable with a spindle supported for rotation by a spring casing, and a flat spirally wound spring located in said casing and having its outer end fixed to the casing and its inner end connected to said spindle whereby the spring is wound as a cable is unwound from the cable drum, said spring being incrementally strengthened from the inner to the outer ends thereof in a manner such that the spring force obtainable by completely unwinding the cable from the cable drum is greater than the normal maximum load applied to the towing cable.

This construction of the spring renders it possible to leave unstrengthened the portion of the spring element taken up for the towing cable run-out required in any case up to the starting point of the passenger, whilst nevertheless obtaining a progressively rising spring force for the continued towing rope run-out which should still appropriately be of appreciable length, by virtue of the remaining strengthened portion of the spring element.

In order that the invention may be clearly understood one embodiment thereof will now be described, by way of example, with reference to the accompanying drawings, in which.

Figure 1:
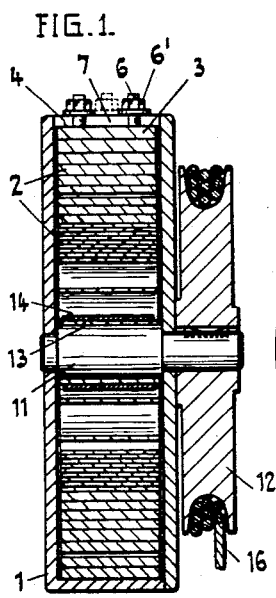
FIG. 1 is an axial section through a towing device according to the invention.

Referring to the drawings, the towing device therein illustrated is suitable for a ski lift and comprises a cylindrical spring case 1 which is suspended as a driving device from the carrying or traction cable (not shown) of the ski lift. A strip spring 2 is coiled spirally in the case 1 in a multiplicity of turns and the outer extremity 3 of the strip is secured in flat contact with the inner surface of the wall 4 of the case 1 by three bolts 6, arranged in a triangular pattern, and nuts 6' screwed on the bolts. Two of the bolts 6 close to the extremity 3 of the strip are situated beside each other and are spaced apart in a slot 7 formed in the wall 4 to be parallel to the axis of the case, and the third bolt 6 extends through a similar slot 8 spaced from slot 7 on the winding direction of the spring 2.

In order to increase its flexing resistance, the spring 2 has a multiplicity of its turns, starting from its outer extremity 3, strengthened by using greater strip thicknesss than for the remaining inner turns. This strengthening diminishes however from the outside towards the inside, in such manner, for example, that in comparison with the thickness at the inner extremity 9, FIG. 2, of the spring, the thickness of the spring along 1½ to 2 turns starting from the outer extremity 3 is four times as great, along the next 2¼ to 3 turns is three times as great, and then along the next 3 to 4 turns is twice as great as the thickness of the spring along the remaining 10 to 11 inner turns. The increments in strip thickness follow each other in gradual transitions, and may have a different ratio with respect to each other.

The inner extremity 9 of the spring 2 is bent over and inserted into an axial groove 10 formed in the spindle 11 of a cable drum 12 laterally situated with respect to the case 1, through which the spindle 11 extends, FIG. 1. The innermost turn 13 of the spring is held in contact with the surface of the spindle 11 by means of a clamping sleeve or clip 14 and the distance of this surface from the axis of the spindle 11 gradually increases from the inner extremity of the turn 13, along the same, by the thickness of the spring 2 at this inner extremity. The clamping sleeve 14, which does not itself act on the spindle 11, has a slot through the spring which emerges, and gradually diminishes in thickness towards the two clamping extremities 15 of the slot.

Figure 2:
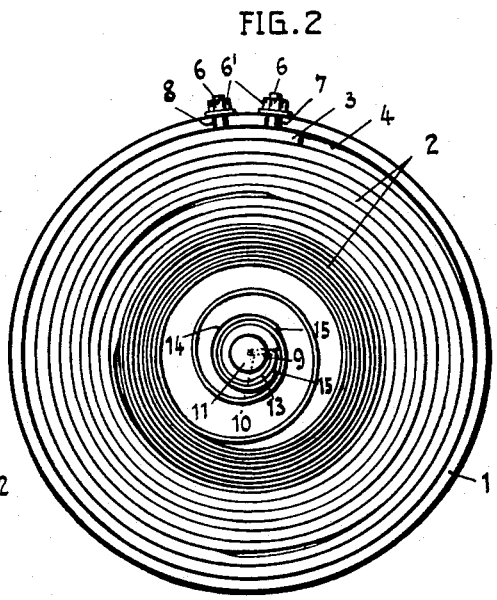
FIG. 2 is a view of an opened spring housing embodied in the device.

During the unreeling of the towing cable 16, wound on the drum 12, the spindle 11, as viewed in FIG. 2, turns counter-clockwise and initially winds the spring turns of smallest thickness tightly on to the clamping sleeve 14, whilst overcoming the return force of the inner spring turns which increases in approximately linear manner. The portion run out of the towing cable 16 reaches a length which at the starting point of the user approximately corresponds to the distance from his "pick-up" point to the spring case 1. As the cable continues to run out, the spring force rises progressively according to the increasing thickness of the strip or leaf spring and thus impedes the unreeling of the cable more and more, so that the tractive force of the carrying cable is applied gradually and without jerks. The spring force obtainable when the cable is completely unwound from the cable drum is greater than the normal maximum load applied to the cable.

Figure 5:
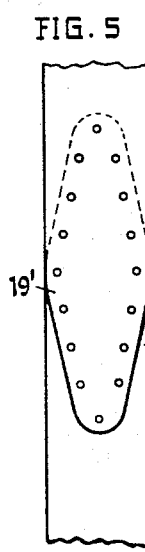
FIGS. 5 and 6 are respectively a front and a side elevation showing the connection of unequally thick portions of a spring strip.
Figure 6:
Figure 3:
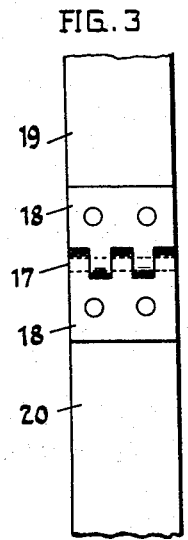
FIGS. 3 and 4 are respectively a front and side elevation of a hinge coupling for two articulated portions of the spring element.
Figure 4:
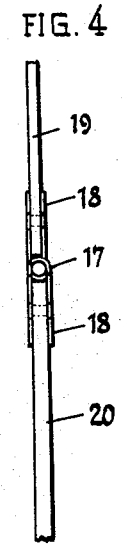

The incremental thickness of the one-piece strip or leaf spring 2 may be obtained by rolling. The strip spring may, however, have a uniform variation in cross-section along its full length or part of its length, or it may be assembled from several sections having the required lengths and desired thicknesses. In order to connect separate spring portions of different thickness one may either employ hinges 17, FIGS. 3 and 4, the flanges 18 of which are riveted to the extremities 19 and 20 of adjoining strip portions, or, as shown in FIGS. 5 and 6, the extremities 19' and 20' of adjoining strip portions may be ground to provide chamfered faces which when placed on each other may be riveted, welded or preferably bonded to each other. These overlapping extremities appropriately have their corners rounded off, or as shown in FIG. 5, may taper down in width towards the thin edges. The spring element may thus be assembled from separate sections or made as a unitary element of different stiffness. A decreasing strength may, of example, also be obtained by appropriate reduction in the width of the spring element.

What is claimed is:

1. A towing device comprising a cable drum rotatable with a spindle supported for rotation by a spring casing, and a flat spirally wound spring located in said casing and having its outer end fixed to the casing and its inner end connected to said spindle whereby the spring is wound as a cable is unwound from the cable drum, said spring having a cross-section which increases stepwise from said inner end toward said outer end thereof whereby the spring is incrementally strengthened from the inner to the outer end thereof in a manner such that the spring force obtainable by completely unwinding the cable from the cable drum is greater than the normal maximum load applied to the towing cable.

2. A towing device according to cliam 1, wherein the spring consists of a plurality of strips each of different but uniform thickness, said strips being connected by hinges in end-to-end relation and in sequence of decreasing thickness from the outer to the inner end of the spring.

3. A towing device according to claim 1, wherein the spring consists of a plurality of strips each of different but uniform thickness, said strips having chamfered overlapping ends connected one to the other and being connected in sequence of decreasing thickness from the outer to the inner end of the spring.

4. A towing device comprising a cable drum rotatable with a spindle supported for rotation by a spring casing, a flat spring spirally wound and located in said casing, bolts connecting the outer end of the spring to the casing and passing through slots formed in the casing to be parallel with the axis of said spindle and spaced apart in the direction of winding of the spring, and means connecting the inner end of the spring with said spindle whereby the spring is wound as a cable is unwound from the cable drum, said spring having a cross-section which increases stepwise from said inner end toward said outer end of the spring whereby the latter is incrementally strengthened from the inner to the outer end thereof in a manner such that the spring force obtainable by completely unwinding the cable from the cable drum is greater than the normal maximum load applied to the towing cable.

5. A towing device according to claim 4, wherein the spring consists of a plurality of strips each of different but uniform thickness, said strips being connected by hinges in end-to-end relation and in sequence of decreasing thickness from the outer to the inner end of the spring.

6. A towing device according to claim 4, wherein the spring consists of a plurality of strips each of different but uniform thickness, said strips having chamfered overlapping ends connected one to the other and being connected in sequence of decreasing thickness from the outer to the inner end of the spring.

References Cited

UNITED STATES PATENTS

| | | | |
|---|---|---|---|
| 47,166 | 4/1865 | Davis et al. | 267—1 |
| 185,872 | 1/1877 | Solomon | 267—1 |
| 198,179 | 12/1877 | Anderson | 267—1 |
| 3,194,343 | 7/1965 | Sindlinger | 267—1 |

FOREIGN PATENTS

| | | |
|---|---|---|
| 849,722 | 12/1939 | France. |
| 1,109,556 | 1/1956 | France. |

ARTHUR L. LA POINT, *Primary Examiner.*

EUGENE G. BOTZ, *Examiner.*

D. F. WORTH, *Assistant Examiner.*